July 15, 1969  H. HERTEL  3,455,523
AIRCRAFT TAIL
Filed July 11, 1966  4 Sheets-Sheet 2
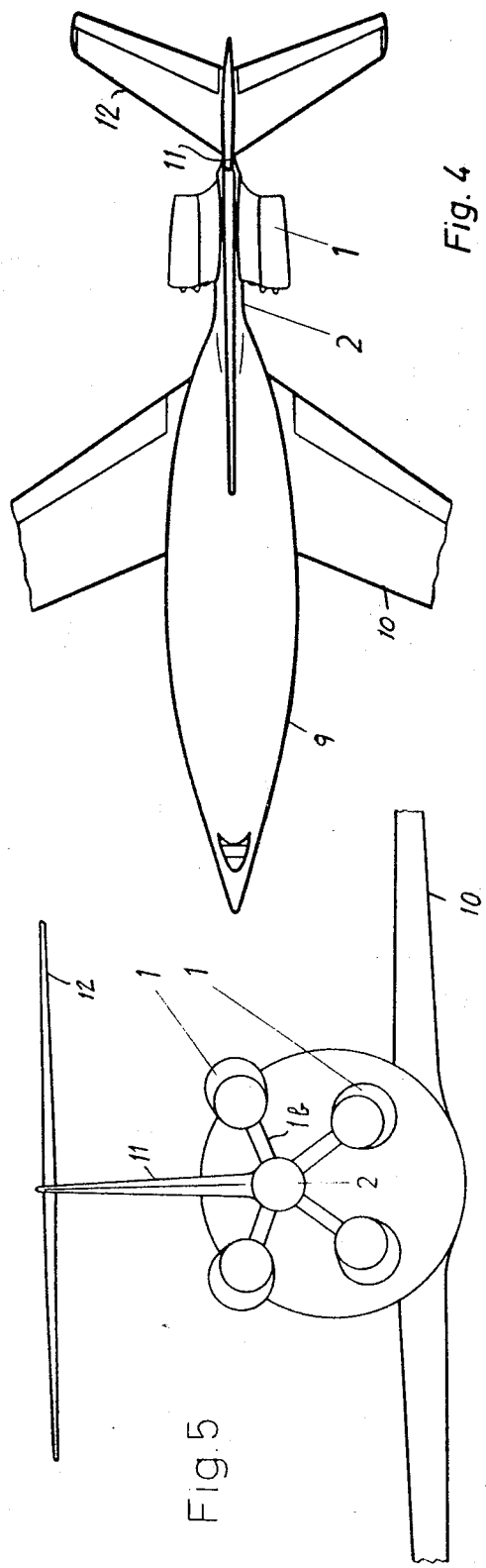
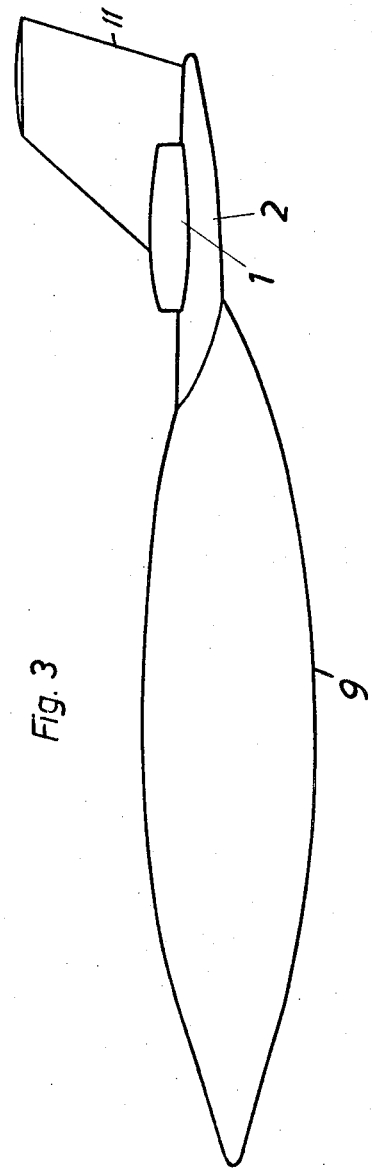
INVENTOR
Heinrich Hertel
BY Michael S. Striker
ATTORNEY

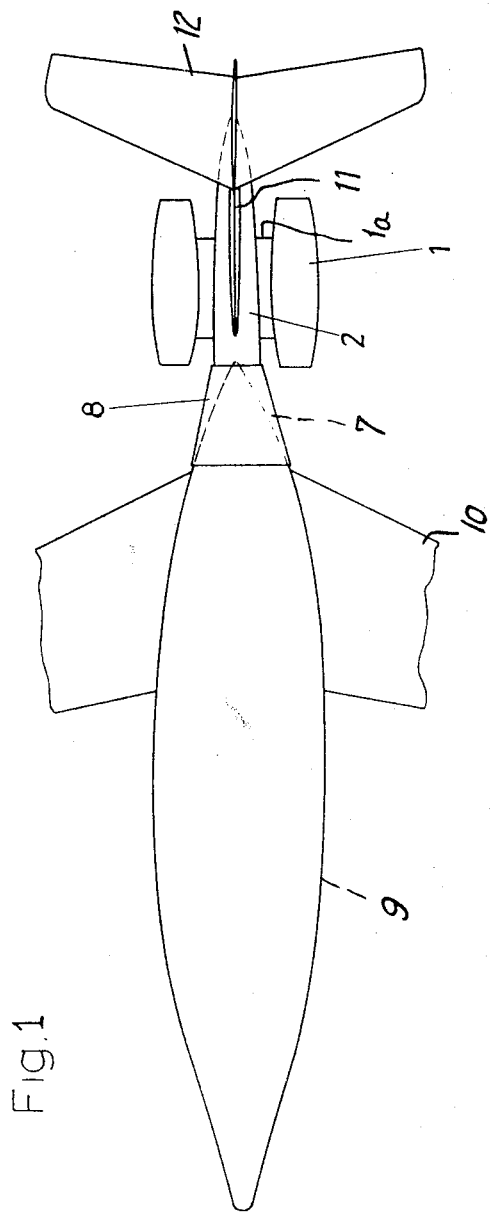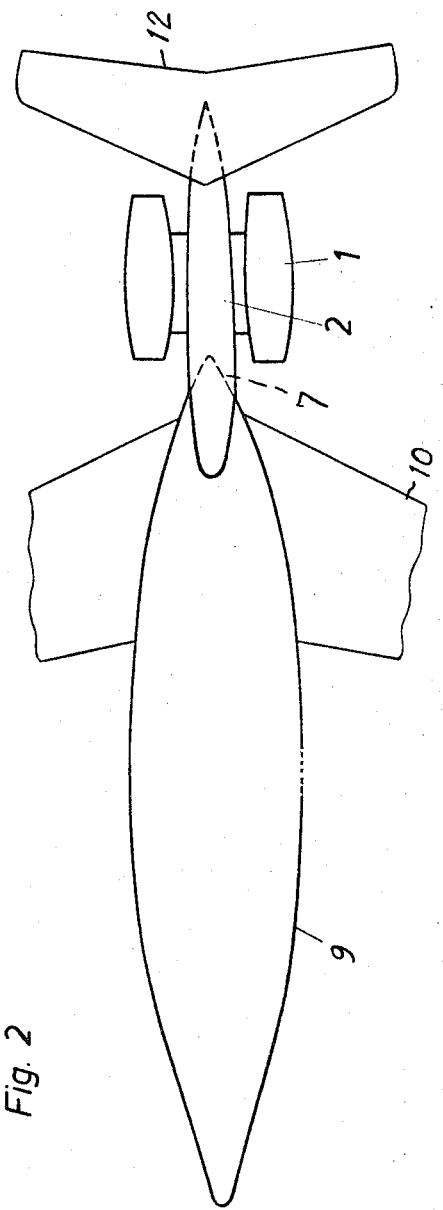

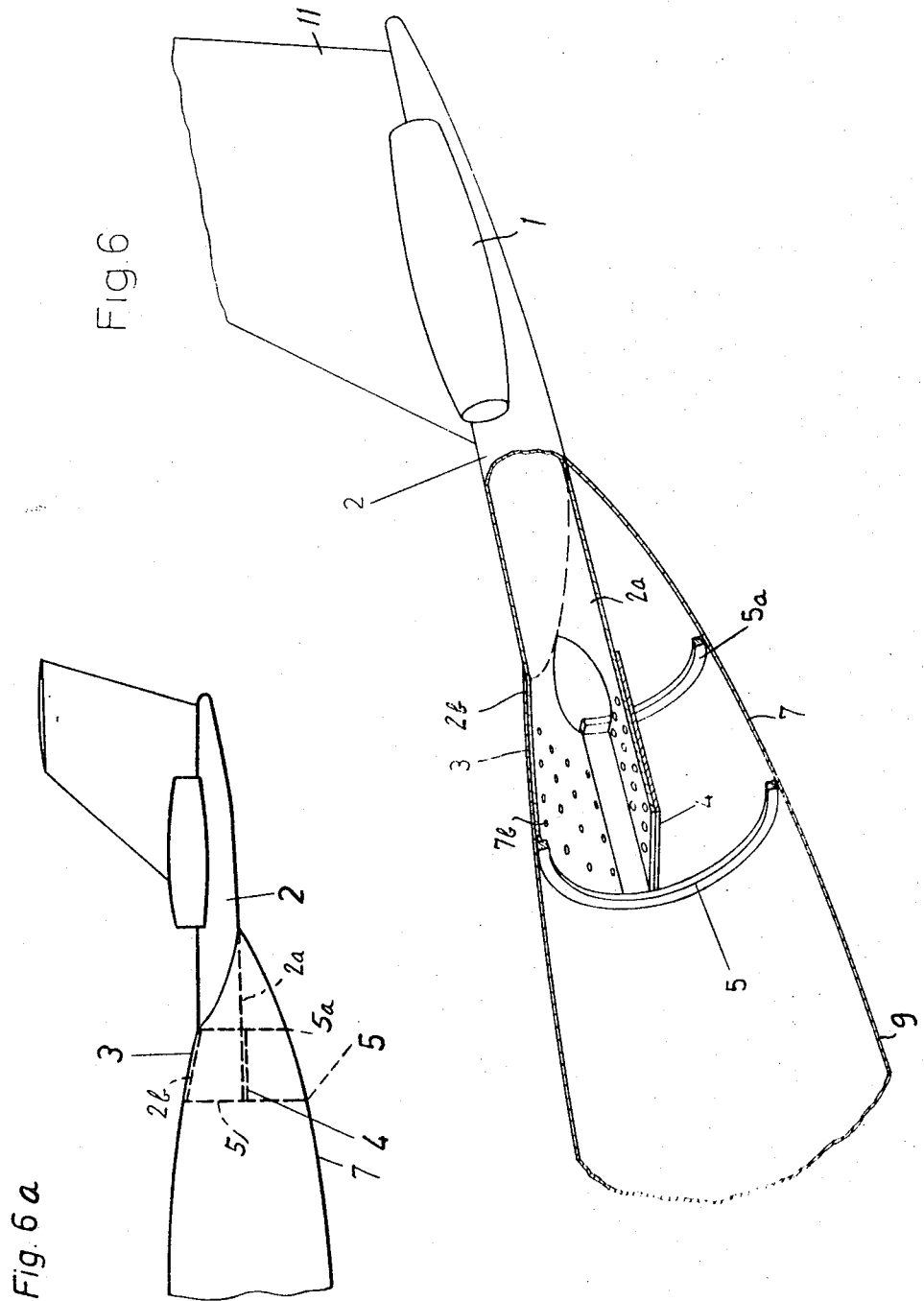

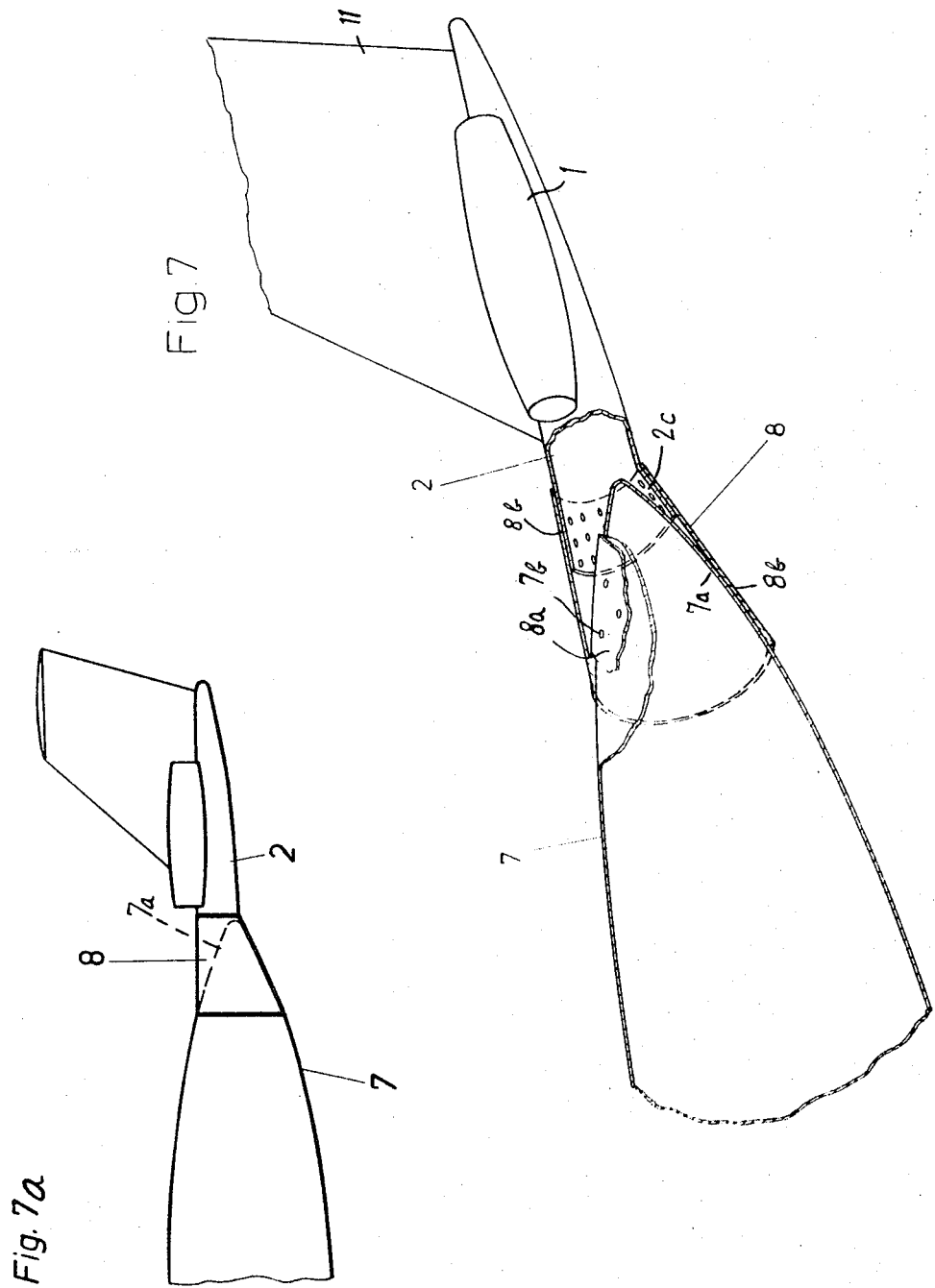

United States Patent Office 3,455,523
Patented July 15, 1969

3,455,523
AIRCRAFT TAIL
Heinrich Hertel, 36 Tannenbergallee,
Berlin 19, Germany
Filed July 11, 1966, Ser. No. 564,287
Claims priority, application Germany, July 15, 1965,
H 56,590
Int. Cl. B64d 27/20; B64c 1/38
U.S. Cl. 244—55                          12 Claims

ABSTRACT OF THE DISCLOSURE

A cantilever support is secured to the rear end portion of the fuselage of an aircraft, and supports jet engines rearwards of the rear end portion of the fuselage whereby detrimental effects of jet engines on the fuselage are avoided.

---

The present invention relates to an aircraft tail, and more particularly to an improvement of the mounting of engines and steering devices on the rear end of the fuselage of the aircraft.

According to the prior art, engines, particularly jet engines, are either mounted within the aircraft, for example within the fuselage or within the wing root, or outside of the aircraft, particularly under the wing, or laterally of the fuselage. Engine supports according to the prior art have the disadvantage that streams of air flowing along the engines and along the aircraft parts on which they are mounted, interfere with each other and cause an increased resistance and drag. Another difficulty encountered by the prior art is that jet streams emitted at very high speed, cause very high sonic pressures acting on adjacent walls of the wings, fuselage, and steering devices and causing fatigue of the metal walls.

It is one object of the invention to overcome this disadvantage of the prior art, and to mount the engines on the aircraft in such a manner as to obtain highest efficiency in the operation of the aircraft.

Another object of the invention is to mount the engines on the tail of an aircraft in such a manner as to overcome interference and diffuser effects between air streams.

Another object of the invention is to mount the engines on the tail of the fuselage of an aircraft in such a manner that detrimental effects of the engine on the fuselage are avoided.

Another object of the invention is to mount engines on the tail of an aircraft in a manner which is particularly favorable for aircraft having a thick and short fuselage.

Another object of the invention is to mount the engines of an aircraft in a position rearwardly spaced from the rear end portion of the fuselage.

With these objects in view, one embodiment of the invention comprises the fuselage rear end portion of an aircraft, an elongated cantilever support secured to a rear end portion rearwardly projecting from the same and having a substantially smaller cross section than the rear end portion of the fuselage, and engine means, preferably including a plurality of jet engines arranged symmetrically to the axis of the support, secured to the support spaced from the rear end portion of the fuselage.

Due to the fact that the engines are carried by a rearwardly projecting spear-like support spaced from the fuselage, detrimental effects of the engines on the fuselage are avoided, and neither interference of air streams, nor impingement of the walls of the fuselage by high pressure sonic waves takes place.

The engine support according to the present invention has preferably a round cross section, is supported in the interior of the fuselage rear end portion, and projects rearwardly like a spear from the rear end of the fuselage. The spear-like support is secured in such a manner to the fuselage rear end portion, that transverse forces, and torsion moments, are smoothly transferred to, and taken up by the tapering tubular wall of the fuselage rear end portion. Since the forces and torques act on the spear-like support only a short distance from the rear end of the fuselage, it is possible to construct the support very thin so that it is clearly distinct from the far thicker fuselage end portion. The length, the direction of the axis, and the position of the spear-like support in relation to the fuselage are selected to obtain optimal operational conditions for the particular aircraft.

In the preferred embodiment of the invention, the front end of the support is secured to the top half of the rear end portion of the fuselage, and the axis of the support is parallel to the main axis of the fuselage and located above the same.

In accordance with the invention, not only the engines, but also the steering devices, such as the rudder, and elevators, are mounted on the support, preferably rearwardly of the engines.

For a small aircraft, it is preferred to mount a pair of engines on horizontal short struts on opposite sides of the support. For larger aircraft, short struts project in a star-shaped pattern from the support and respectively carry jet engines which are spaced about the axis of the support. The positions of the jet engines are selected in such a manner that the stream of air along the rear end portion of the fuselage caused by the engines is favorable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary schematic plan view illustrating an aircraft tail according to a first embodiment of the invention;

FIG. 2 is a fragmentary schematic plan view illustrating an aircraft tail according to a second embodiment of the invention;

FIG. 3 is a fragmentary schematic side elevation of the embodiment of FIG. 2;

FIG. 4 is a fragmentary schematic plan view of a modified embodiment of the invention;

FIG. 5 is a fragmentary schematic rear view of the embodiment of FIG. 4;

FIG. 6 is a fragmentary perspective view, partially in section, illustrating an aircraft tail according to the embodiment of FIGS. 2 and 3;

FIG. 6a is a fragmentary schematic side view illustrating the embodiment of FIGS. 2, 3 and 6;

FIG. 7 is a fragmentary perspective view, partially in section, illustrating the embodiment of FIG. 1; and FIG. 7a is a fragmentary schematic side view illustrating the embodiment of FIGS. 1 and 7.

Referring now to the drawings, a comparatively thick and short fuselage 9 carries near the rear end a pair of wings 10, and has a rear end portion 7. A spear-like cantilever support 2 is secured to the rear end portion of the fuselage and projects rearwardly from the same in the vertical plane of symmetry of the aircraft and fuselage, as shown in FIGS. 1 and 2. Engines 1 are carried by short struts 1a projecting from support 2. Rudder means 11, and elevator means 12 are carried by support 2, and are partly located rearwardly of the engines.

In all embodiments of the invention, the support 2 is an elongated, hollow spear-like structure whose cross section is substantially smaller than the cross section of the fuselage, or of any portion of the fuselage on which engines can be mounted according to the prior art.

Referring now particularly to the first embodiment of the invention illustrated in FIGS. 1, 7 and 7a, the pointed end 7a of the tapering tubular rear end portion 7 of the fuselage is surrounded by the front end of a rearwardly tapering tubular shell 8. Rivets 7b secure a wall portion 8a to the top portion of the wall of rear end portion 7a, and other rivets, not shown, secure the main wall 8b of shell 8 to the lower bottom wall of rear end portion 7a.

The rear end of wall 8b is secured by rivets to the annular frusto-conical front end portion of the annular wall of support 2. As best seen in FIG. 7a, the shape of shell 8 is selected so that support 2 is mounted on the upper half of the fuselage rear end portion 7 and has an axis located above, and extending parallel to the main axis of the fuselage.

In the embodiment of FIGS. 2, 3, 6 and 6a, support 2 has at the front end thereof, a substantially semi-circular top wall portion 2b, and a lower straight bottom wall portion 2a. An annular member 5, and a curved member 5a are secured to the inner surface of the tapering tubular wall of rear end portion 7, and carry a straight horizontal wall 4 to which wall 2a of support 2 is secured by rivets. The curved top wall 2b of the front end of support 2 is secured by rivets 7b to the curved top portion of the tubular wall of fuselage rear end portion 7. The rear end of said support; and wherein said engine means include support 2 projects rearwardly. As best seen in FIG. 6a, support 2 is mounted on the top half of the tapering fuselage rear end portion 7 and has an axis located above, and extending parallel to the main axis of the fuselage. Support wall 4 is substantially located in the main axis of the fuselage.

The above described embodiments of the invention are provided with a pair of engines 1 mounted on opposite sides of support 2 on short horizontal struts 1a. This construction is particularly suitable for smaller aircraft, but if a greater propulsion force is required, all embodiments of the invention are modified as shown in FIGS. 4 and 5. Struts 1b are angularly spaced and arranged in a star-shaped pattern about support 2 and carry engines 1 spaced from each other. Preferably, the rudder means 11 is disposed between a pair of engines 1, and elevator means 12 are mounted on support 2 rearwardly of the engines.

It will be understood that each of the elements described above, or two or more together, may also find a useful application in other types of aircraft tails differing from the types described above.

While the invention has been illustrated and described as embodied in a spear-like elongated slender support rearwardly projecting from the fuselage and carrying engines and steering devices, it is not intended to be limited to the details shown, since various modifications and structural changes may be made without departing in any way from the spirit of the present invention.

What is claimed as new and desired to be secured by Letters Patent is:

1. Aircraft tail comprising, in combination, a fuselage having a maximal width and a rear end portion, an elongated cantilever support secured to said rear end portion of said fuselage projecting rearwardly therefrom and having from one end thereof to the other a substantially smaller width than said fuselage, said cantilever support and said fuselage having a common vertical plane of symmetry; and engine means mounted on said elongated cantilever support spaced from said rear end portion of said fuselage so as to reduce transmission of vibrations from said engine means to said fuselage, and at a distance from the axis of said elongated support which is smaller than half of said maximal width of said fuselage so that said engine means are located at least partly within the slipstream of said fuselage, whereby undesired drag on said fuselage by said engine means is also reduced.

2. Aircraft tail according to claim 1 and including a pair of lateral carrier struts projecting from opposite sides of said support; and wherein said engine means include a pair of engines respectively mounted on said carrier struts.

3. Aircraft tail according to claim 1 and including a plurality of angularly spaced carrier struts projecting from said support; and wherein said engine means include a plurality of engines respectively mounted on said carrier struts spaced about said support.

4. Aircraft tail according to claim 1 and including steering means mounted on said cantilever support.

5. Aircraft tail according to claim 4 wherein said steering means are foil means at least partly located rearwardly of said engine means.

6. Aircraft tail according to claim 1 and including a rearwardly tapering tubular shell having a wider front end surrounding said fuselage rear end portion and being secured to the same, and a narrower rear end surrounding said support and being secured to the same for supporting the same on said fuselage rear end portion.

7. Aircraft tail according to claim 1 wherein said fuselage rear end portion includes a rearwardly tapering tubular wall having a top half and a bottom half, a substantially horizontal support wall between said top half and said bottom half, and curved supporting means abutting the inner surface of said tubular wall for supporting said horizontal support wall in said tubular wall; and wherein said support projects into said fuselage rear end portion and is secured to said top half of said tubular wall and to said horizontal support wall.

8. Aircraft tail as claimed in claim 1 wherein said fuselage has a main axis; wherein said rear end portion of said fuselage has an upper part and a lower part; wherein said cantilever support has the forward end thereof secured to said upper part and projects rearwardly from the same; and wherein said cantilever support has an axis located above said main axis and in a common plane with the same.

9. Aircraft tail as claimed in claim 8 wherein said axis of said cantilever support is parallel with said main axis.

10. Aircraft tail as claimed in claim 1 wherein said engine means are jet engine means; and including strut means supporting said jet engine means transversely spaced from said cantilever support and in a position in which the front ends of said jet engine means are located rearward of said rear end portion of said fuselage.

11. Aircraft tail as claimed in claim 1 wherein said cantilever support has a substantially cylindrical cross section and a tapered rear end disposed rearward of said engine means.

12. Aircraft tail comprising, in combination, a fuselage having a maximal width and a rear end portion, an elongated cantilever support secured to said rear end portion of said fuselage projecting rearwardly therefrom and having from one end thereof to the other a substantially smaller width than said fuselage; engine means mounted on said elongated cantilever support spaced from said rear end portion of said fuselage so as to reduce transmission of vibrations from said engine means to said fuselage, and at a distance from the axis of said elongated support which is smaller than half of said maximal width of said fuselage so that said engine means are located at least partly within the slipstream of said fuselage, whereby undesired drag on said fuselage by said engine means is also reduced; and steering means mounted on said cantilever support and including a rudder, and horizontal elevators.

References Cited

UNITED STATES PATENTS

| | | | |
|---|---|---|---|
| 2,969,938 | 1/1961 | Wallis | 244—52 X |
| 2,863,620 | 12/1958 | Vautier | 244—55 X |
| 2,958,480 | 11/1960 | Saulnier | 244—54 X |
| 3,075,728 | 1/1963 | Kogan | 244—55 |
| 3,237,891 | 3/1966 | Wotton | 244—55 |

FOREIGN PATENTS 894,797   4/1962   Great Britain.

MILTON BUCHLER, Primary Examiner

JAMES E. PITTENGER, Assistant Examiner

U.S. Cl. X.R.

244—130